United States Patent [19]

Bichara

[11] 4,087,575
[45] May 2, 1978

[54] LIQUID CRYSTAL FILM

[76] Inventor: Kamal F. Bichara, 911 S. Gordon Sq., Bolivar, Ohio 44612

[21] Appl. No.: 716,430

[22] Filed: Aug. 23, 1976

Related U.S. Application Data

[63] Continuation-in-part of Ser. No. 515,088, Oct. 16, 1974, abandoned.

[51] Int. Cl.² .......................... C09K 3/34; A61B 5/00; B05D 3/02
[52] U.S. Cl. ......................................... 428/1; 428/215; 428/335; 428/339; 428/913; 73/356; 128/2 H; 350/330; 427/385 R
[58] Field of Search ................. 350/160 LC; 252/299, 252/408 LC; 73/356; 128/2 H, 156; 428/1, 523, 524, 913, 215, 334, 335, 339; 427/385 R

[56] References Cited

U.S. PATENT DOCUMENTS

| | | | |
|---|---|---|---|
| 3,993,809 | 11/1976 | Schranz et al. | 128/2 H |
| 4,048,358 | 9/1977 | Shanks | 350/160 LC |
| 4,060,654 | 11/1977 | Quenneville | 128/2 H |

FOREIGN PATENT DOCUMENTS 2,411,767  10/1975  Germany.

*Primary Examiner*—William R. Dixon, Jr.
*Attorney, Agent, or Firm*—Harold S. Meyer

[57] ABSTRACT

Liquid crystal preparations, for examination of objects by visualizing temperature differences, are made in the form of highly stretchable elastomeric films by dispersing cholesteric liquid crystal esters in a solution of a thermoplastic elastomer such as plasticized polyvinyl butyral solution, and casting a thin film from the solution. Preferably, a light-absorbing lamina is included to enhance the color contrast.

14 Claims, No Drawings

LIQUID CRYSTAL FILM

CROSS-REFERENCE

This is a continuation in part of my application Ser. No. 515,088 filed Oct. 16, 1974, now abandoned.

BACKGROUND

Liquid crystals consisting of mixed cholesteric esters are known to undergo color changes at very specific temperatures in the neighborhood of normal room temperature or body temperature. Consequently, such liquid crystals have been found to be very sensitive indicators of small differences in temperature. This has permitted the liquid crystal materials to be used as extremely accurate indicators of locations where temperature differences exist, so as to give visual indication of the location of discontinuities such as flaws in articles supplied with heat at one side, or the location of zones of differing heat capacity or differing vascularity in living tissues.

The practical use of liquid crystals has been somewhat inconvenient in that successful surface contact has required application of the liquid crystal material to the surface to be examined in liquid form, and has also required removal of the liquid crystal material by some kind of washing operation after the examination is completed.

The object of this invention, accordingly, is to provide liquid crystal materials in a solid form which can be applied in continuous intimate contact with surfaces to be examined in a very simple way, and can be removed after the examination is completed without requiring any elaborate cleanup procedure.

SUMMARY OF THE INVENTION

I have discovered that the cholesteric esters which form multicolored liquid crystals can be dispersed in solutions of film-forming thermoplastic elastomers such as plasticized vinyl resins, which are then converted to thin, stretchable, rubbery films, as by film casting. Preferably the film is very thin so as to consume only a small quantity of material for each use, and so as to conform easily to either plane or curved surfaces. In addition, the film is preferably laminated, with a protective layer on one or both sides to prevent either escape or deterioration of the liquid crystal material. A black layer on one side helps in the perception of the color changes as they occur.

Thermoplastic elastomers which are suitable for use in this invention can be of several different kinds. One kind is thermoplastics capable of being converted to elastomers by incorporation of a large volume of a suitable plasticizer or plasticizers such as plasticized polyvinyl resins and particularly elastomeric plasticized polyvinyl chloride and elastomeric plasticized polyvinyl butyral. Another kind is inherently elastomeric polymers such as the polymers of the lower esters of acrylic acid. Still another kind is block copolymers with thermoplastic end blocks and elastomeric mid blocks. Each kind, when suitably prepared, is highly resilient and stretchable like vulcanized rubber, but differs from vulcanized rubber in being thermoplastic, and therefore being soluble in suitable solvents.

The particular thermoplastic elastomers of each class which are chosen for use should be those which are compatible with, that is, those which are easily soluble in the same solvents as, the cholesteric liquid crystal materials which are to be used. Since the liquid crystals are esters of a cyclic alcohol of a relatively high molecular weight, they are generally compatible with hydrocarbon or ester or ether type polymers. Thus polyvinyl butyral plasticized with a nonvolatile liquid ester such as dioctyl phthalate is a preferred thermoplastic elastomer. Another preferred type is a high molecular weight elastomeric polymer of an acrylic ester such as poly (ethyl acrylate) or poly (butyl acrylate). Still another preferred type of thermoplastic elastomer is a block polymer of moderately high molecular weight with an elastomeric center block and rigid terminal blocks such as one with a central block of poly(ethyl acrylate) of molecular weight about 50,000 and terminal blocks of poly (Methyl methacrylate) of molecular weight about 10,000 each.

Other kinds of thermoplastic elastomers can also be used. Preferably they are not only thermoplastic but also soluble in neutral solvents for convenience in film casting in very thin sheets. Vulcanizable elastomers are not preferred since the properties that confer vulcanizability also make them somewhat unstable in the absence of vulcanization. Moreover, vulcanization is a needless and expensive complication requiring use of highly reactive chemicals which are likely to damage the liquid crystal materials.

Although it is possible to prepare films made from various thermoplastic elastomers in which the liquid crystals are dispersed, I presently prefer plasticized polyvinyl butyral since it forms strong, highly resilient films, and dissolves easily in solvents which are inexpensive and are suitable for incorporation of the liquid crystal materials.

The films containing liquid crystals can be applied to and removed from objects to be examined, quickly and easily, and surprisingly give color intensity and brilliance generally equal and sometimes superior to naked liquid crystal material applied directly to the object being examined.

DETAILED DESCRIPTION

For preparation of a preferred form of the film material of this invention, a strong, flexible, but nearly inextensible film substrate may be used, of a material which is not much affected by the isopropyl alcohol and hydrocarbon solvents used in casting the film of this invention. This substrate functions only as a temporary support, and is removed and discarded before the product is used. Polyethylene terephthalate film of about 0.05mm (2 mil) thickness, such as is sold under the trademark Mylar, is suitable. Its extensibility is so low that on manual tensioning it appears to be completely inextensible.

A release agent is preferably applied first to the substrate. It may consist of a water-soluble grade of polyvinyl alcohol such as one in which the original polyvinyl acetate is 80% hydrolyzed to alcohol. A 10% solution in isopropyl alcohol is cast on the substrate to a wet thickness of about 0.04mm (1.5 mil) and is dried, leaving a coat of about 0.004mm (1.5 mil) on the substrate.

Polyvinyl butyral with about 19% residual vinyl alcohol content in the polymer and not over 2.5% vinyl acetate content is dissolved in isopropyl alcohol to form a homogeneous solution of about 15% concentration, which is a clear liquid with a Brookfield viscosity of about 20,000 CPS at room temperature, which insures a good flow rate for casting. For the preparation of a highly stretchable film, suitable for application to a human breast for detection of a mammary cancer, elasticizers and plasticizers are then added, such as 27 parts by weight of castor oil and 27 parts of a polyether plasticizer which is a diaryl ether of polyoxyethylene for each 100 parts of polyvinyl butyral in the solution. This composition in thin film form, after elimination of volatile solvents, is easily stretchable by hand to twice its original dimension, and contracts to nearly its original size when released.

One portion of the plasticized polyvinyl butyral solution is further mixed with 8 parts of a 40% carbon black suspension in alcohol for each 100 parts of polyvinyl butyral, to form a light-absorbing and opacifying layer. This is cast over the polyvinyl alcohol on the substrate to a wet thickness of about 0.09mm (3.5 mils) producing a dry lamina of about 0.02mm (0.8 mils).

Another portion of the plasticized polyvinyl butyral solution is mixed with a cholesteric liquid crystal material, which may be one of the usual mixtures of cholesteric nonoate, benzoate, and oleylcarbonate of the proper proportions for indicating a particular desired range of temperatures, or if desired, a mixture of cholesteric with nematic liquid crystal material. A suitable quantity of liquid crystal material is about 1 part by weight for 8 parts of the resin solution, or about 90 parts of liquid crystal for 100 parts of polyvinyl butyral. The addition of a hydrocarbon solvent improves the colors and assures a suitable fineness of dispersion of the liquid crystal. For example, toluene up to twice the weight of liquid crystal or hexane up to one fourth the weight of liquid crystal give good results. Preferably a small quantity of a surfactant may be added also to help maintain a level surface while the solution is drying. Although almost any surfactant soluble is isopropyl alcohol may be used, a fluoralkyl phosphate material in the proportion of 2 to 4 parts in 100 of polyvinyl butyral gives good results. This solution is cast over the black lamina to a wet thickness of about 0.1mm (2 mils) producing a dry lamina of about 0.015mm (0.5 mils).

Finally, a protective surface lamina is applied by casting a 17% water solution of polyvinyl alcohol in a wet thickness of 0.05mm (2 mils) or a dry thickness of about 0.01mm (0.3 mils). This results in an overall thickness of about 0.085mm (3 to 4 mils) for the finished film including the substrate.

This laminated film can be packaged and shipped in sheets or rolls, and is stable and resistant to deterioration from light or air.

For use, the surface lamina, the last one applied, consisting of polyvinyl alcohol, is washed off with water, and the remaining film is peeled off of the supporting substrate. The film is resilient and easily stretched. It can be applied to a surface of almost any fairly regular shape by stretching it somewhat, pressing the black backing against the surface to be examined, and releasing it, whereupon the film will shrink into firm contact and will cling because of its thinness and rubberlike elasticity.

The usual tests or examination procedures may be carried out in a simpler manner than was previously possible, because of the absence of need for applying any liquid to the test object, or any need for subsequent cleaning. When the examination is completed, the film is readily stripped from the test object and may be discarded or may be used in a subsequent test if not injured by handling.

The colors are particularly bright and easily observed because of the black background and the uniformity of thickness of the liquid crystal materials.

For the preparation of a relatively firm film product, stretchable to about 50% greater length than its manufactured size, the same polyvinyl butyral solution is mixed with a smaller total quantity of elasticizer and plasticizer, such as 6.6 parts dioctyl phthalate and 27 parts castor oil for each 100 parts polyvinyl butyral.

A portion of this solution of plasticized polyvinyl butyral is then mixed with carbon black as described above, and is cast over a polyvinyl alcohol release coating on a polyethylene terephthalate film substrate.

Another portion of the solution of plasticized polyvinyl butyral is then mixed with about 90 parts of liquid crystal for 100 parts polyvinyl butyral and is cast over the light-absorbing lamina containing the carbon black pigment. For such a film, which does not have as great extensibility as that first described, it is not important that the protective coat be removed before use. Accordingly, the final protective lamina may be produced from a third portion of the solution of plasticized polyvinyl butyral by casting it, without any added materials, over the layer containing the liquid crystals, to form a permanent transparent coating.

This particular kind of film, because of its limited extensibility, which does not permit easy stretching to more than about 50% increase in length, is especially adapted for application to and subsequent removal from plane or cylindrical surfaces such as the surfaces of machine elements, for nondestructive testing purposes.

In the foregoing specific examples, particular proportions are specified, but each quantity is subject to considerable variation. The quantity of solvent should be such as to produce a viscosity suitable for film formation and may vary from about four to twenty times that of the polyvinyl butyral, depending partly on the thickness of film desired. The lamina which contains liquid crystal material preferably has a thickness in the range of 0.03 to 0.05mm (1 to 2 mils approximately) since this thickness is great enough to provide intense colors which are easily distinguished and small enough to permit easy handling and simple conformation to variously shaped objects, but greater or smaller thicknesses may be useful for special purposes.

The quantity and kind of plasticizers is subject to great variations depending on the extensibility of film desired in any particular instance, as is well understood. A great many plasticizers and elasticizers and their somewhat varying effects on the consistency of the plasticized vinyl resin are very well known and do not need to be discussed in detail.

Although particular grades of polymers have been specified in the foregoing description by way of example, they are not critical, and any of the commercial grades of adequate strength, optical clarity, and solubility may be used.

The quantity of liquid crystal material may also be varied widely, as long as it is adequate to exhibit the color changes and not so great as to interfere with the strength and elasticity of the film forming polymer. Approximately equal quantities of liquid crystal and of the polymer are presently preferred but as little as one fourth as much may be used, up to about double the quantity of polymer, particularly when reinforced by a reasonable thickness of light absorbent backing or by strengthening laminae on both lower and upper faces.

Other ingredients or laminae can be added for special purposes if desired so long as they do not obscure the color changes which are the distinguishing feature of the liquid crystal ingredient and are the primary reason for preparing the described films.

If deterioration of the liquid crystal material from exposure to ultraviolet light should occur, any of the ultraviolet absorbers previously employed with liquid crystals may be added to the final protective lamina.

If it should be preferred to replace the plasticized polyvinyl butyral by some other thermoplastic elastomer, it can be made up into an elastomeric film together with cholesteric liquid crystal material in essentially the same way, using specific solvents known to be suitable for the particular material chosen.

I claim:

1. A color-changing liquid crystal product in self-supporting elastomeric thin film form, comprising cholesteric liquid crystal esters dispersed in direct contact with a matrix of a thermoplastic chemically neutral elastomer in the form of a thin film.

2. A product as in claim 1 in which the elastomer is selected from the class consisting of elastomeric plasticized polyvinyl resins, elastomeric acrylic ester polymers, and elastomeric tri-block polymers with end blocks of a thermoplastic and a central block of elastomer.

3. A product as in claim 1 in which the elastomer is rubbery plasticized polyvinyl butyral.

4. A product as in claim 1 in which the film containing the liquid crystal material is laminated to a thin film of black light-absorbing elastomeric material.

5. A product as in claim 4 in which each film layer consists essentially of elastomeric plasticized polyvinyl butyral, together with, in one layer, cholesteric liquid crystal material, and, in the other layer, black pigment.

6. A product as in claim 1 in which the elastomeric film has a total thickness not over about 2 mils.

7. A product as in claim 5 in which the elastomeric film has a total thickness not over about 2 mils.

8. A product as in claim 1 in which the elastomeric film is in contact with a removable supporting film of essentially inextensible material.

9. A product as in claim 5 in which the elastomeric film is in contact with a removable supporting film of essentially inextensible material.

10. A product as in claim 7 in which the elastomeric film is in contact with a removable supporting film of essentially inextensible material.

11. A product as in claim 10 in which a water-soluble protective film covers the surface opposite to the supporting film.

12. A process for making a color-changing thin film of elastomeric material, which comprises dissolving a thermoplastic elastomer in a volatile neutral solvent together with cholesteric liquid crystal esters, casting a thin film from the resulting solution, and evaporating the solvent.

13. A process as in claim 12, in which the film is cast on an essentially inextensible temporary supporting film of material in soluble in the solvent.

14. A process as in claim 13, in which the thermoplastic elastomer is polyvinyl butyral together with sufficient plasticizer to make the layer containing the polyvinyl butyral elastomeric.

* * * * *